(12) United States Patent
Liu et al.

(10) Patent No.: US 7,505,489 B2
(45) Date of Patent: Mar. 17, 2009

(54) ULTRAHIGH ENERGY SHORT PULSE LASERS

(75) Inventors: Jian Liu, Sunnyvale, CA (US); Jiangfan Xia, Santa Clara, CA (US)

(73) Assignee: PolarOnyx, Inc., Sunnyvale, CA (US)

( * ) Notice: Subject to any disclaimer, the term of this patent is extended or adjusted under 35 U.S.C. 154(b) by 296 days.

(21) Appl. No.: 11/583,489

(22) Filed: Oct. 17, 2006

(65) Prior Publication Data

US 2007/0171945 A1     Jul. 26, 2007

Related U.S. Application Data

(60) Provisional application No. 60/730,832, filed on Oct. 28, 2005, provisional application No. 60/730,632, filed on Oct. 26, 2005, provisional application No. 60/727,350, filed on Oct. 17, 2005, provisional application No. 60/727,351, filed on Oct. 17, 2005.

(51) Int. Cl.
*H01S 3/098* (2006.01)
*H01S 3/13* (2006.01)

(52) U.S. Cl. .......................................... 372/18; 372/25
(58) Field of Classification Search .................. 372/18, 372/25
See application file for complete search history.

(56) References Cited

U.S. PATENT DOCUMENTS

2006/0120418 A1*   6/2006   Harter et al. .................. 372/30

* cited by examiner

*Primary Examiner*—Armando Rodriguez
(74) *Attorney, Agent, or Firm*—Xin Wen

(57) ABSTRACT

A Chirped pulse amplification (CPA) fiber laser system. The CPA fiber laser system includes a fiber mode-locking (ML) oscillator implemented as a cavity dumped ML oscillator including a cavity dumper for generating a seed laser at a reduced repetition rate to project to a pulse stretcher for stretching a pulse width of the laser. The CPA fiber laser system further includes a multistage amplifier chain for generating an amplified laser to project to a compressor for compressing the amplified laser. The multistage amplifier chain further includes a hybrid amplifier includes a solid-state amplifier to generate a laser of approximately 1~10 mJ for a 10-100 KHz repetition rate.

37 Claims, 5 Drawing Sheets

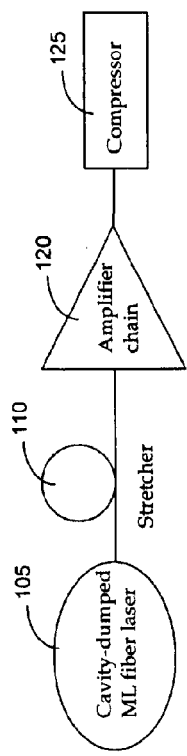
Figure 2 Application of cavity-dumped ML fiber laser in high energy fiber CPA system
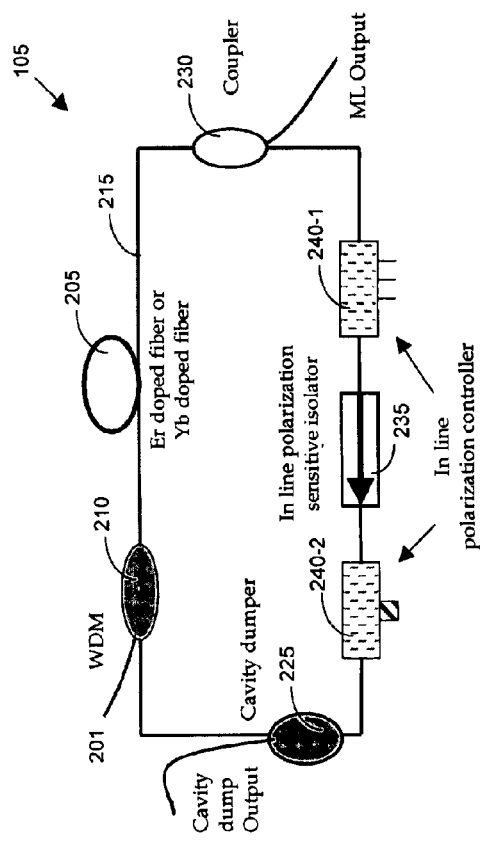
Figure 3 Schematic diagram of a cavity-dumped all-fiber based mode locked fiber laser

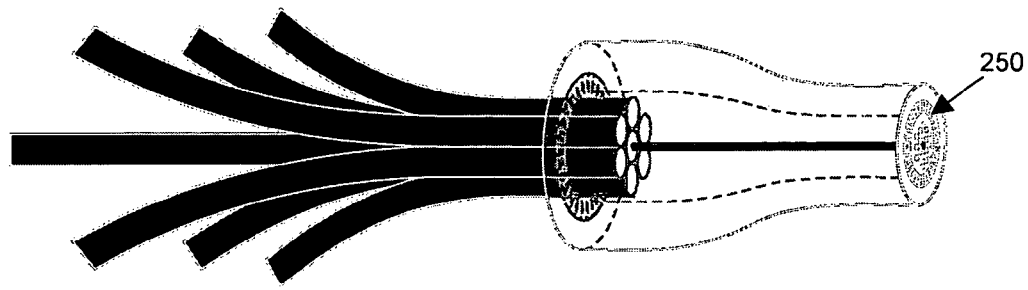
Figure 4 pump combiner for DC PCF (also called air clad fiber)
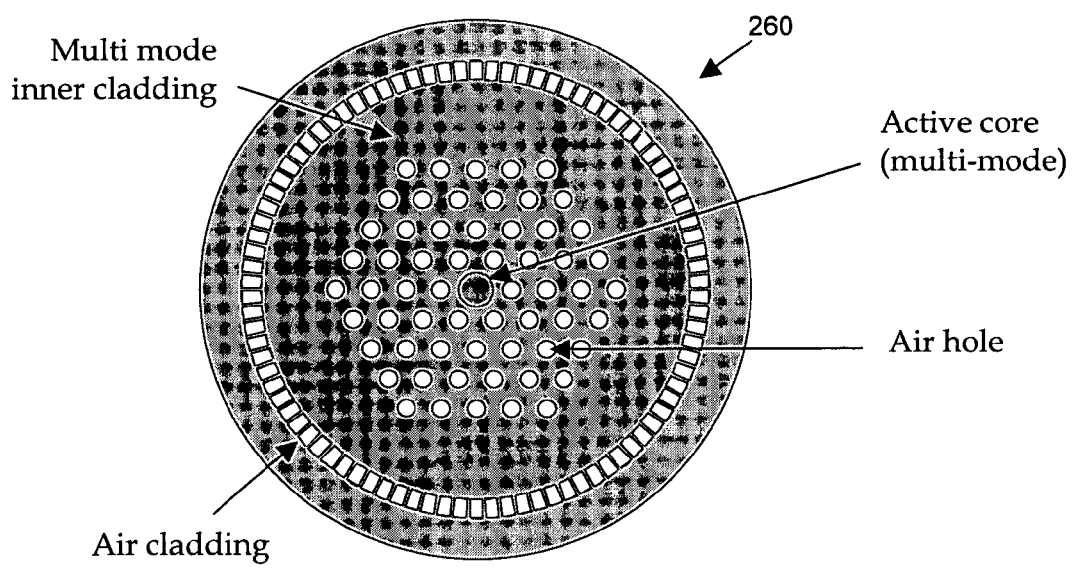
Figure 5 DC PCF fiber structure with multi mode core

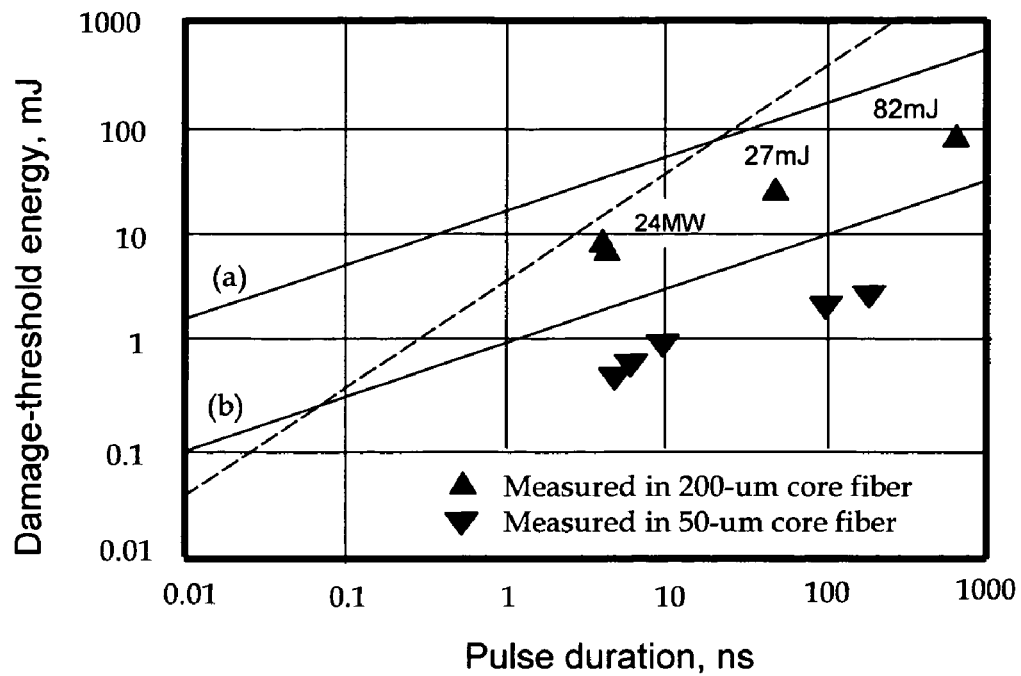
Figure 6 Pulse energy limit vs pulse width
(dashed line: self focusing limit)
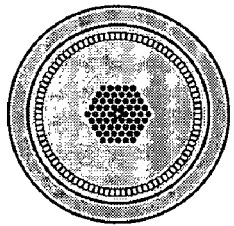
Figure 7A
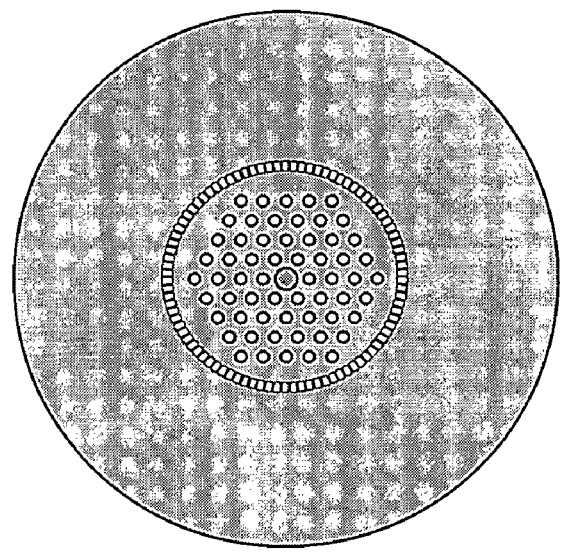
Figure 7B

ULTRAHIGH ENERGY SHORT PULSE LASERS

This Formal Application claims a Priority Date of Oct. 17, 2005 and Oct. 26, 2005 benefited from a Provisional Patent Applications 60/727,350, 60/727,351, 60/730,632, and a Priority Date of Oct. 28, 2005 benefited from Provisional Applications 60/730,832 filed by one of the same Applicants of this Application.

FIELD OF THE INVENTION

The present invention relates generally to apparatuses and methods for providing laser system. More particularly, this invention relates to a design and system configuration for generating lasers with short pulses at ultra-high energy towards tens of mJ energy level femtosecond fiber lasers by combining a Chirped Pulse Amplification (CPA) fiber laser system with a solid state amplifier.

BACKGROUND OF THE INVENTION

Even though current technologies of fiber laser have made significant progress toward achieving a compact and reliable fiber laser system providing high quality output laser with ever increasing output energy, however those of ordinary skill in the art are still confronted with technical limitations and difficulties. Specifically, in a fiber laser system implemented with the Chirped Pulse Amplification (CPA) for short pulse high power laser amplifier, the CPA systems are still limited by the technical difficulties that a short pulse laser with an ultra-high energy over 10 mJ up to 100 mJ cannot be easily generated. There are several technical problems that limit the generation of such ultra-high energy lasers. A first technical confronted those of ordinary skill in the art is the related to the high repetition rate of a mode-locked (ML) oscillator, conventionally 40~100 MHz. Under certain average power, it is hard to get very high pulse energy if one keeps such a high repetition rate. In a typical short-pulse high-energy fiber laser system, the idea of Chirped Pulse Amplification (CPA) is widely implemented. Basically it consists of four parts: a mode-locking (ML) oscillator for providing short laser pulse, a stretcher to get long pulse duration, an amplifier to amplify the laser pulses to a high energy, and a compressor to get short pulse and high peak power. For a lot of applications, high pulse energy and peak power is more interested instead of high repetition rate and/or high average power. In fiber laser system, if the laser system provides an option for selecting some pulses from the high repetition rate ML oscillator as the target pulse for amplification under same average power and/or same pumping level, the laser system is able to amply these picked-up pulses with much higher energy and peak power. Another technical difficulty of a fiber based laser system with short pulses is the limitations due to the nonlinear effects, such as third order dispersion (TOD) cased in fiber based pulse streching, self-phase modulation (SPM), and stimulated Raman effects (SRS).

In order to resolve the high repetition rate (tens of MHz) limitation, a pulse picker as that shown in FIG. 1 is implemented to achieve high peak power in a fiber laser system. In order to suppress the ASE noise and reduce the distortions after the pulse is amplified, a pulse is amplified before the amplified pulses are projected into a pulse picker. This configuration leads to a more complicated system and a higher cost. As an example, the average power from the fiber ML seed is a few mille watts, without the preamplifier, the average power after the pulse picker would be around 1 micro watt, or even lower, which can not dominate the ASE noise in the high gain amplification chain. Even with the preamplifier with an output of <400 mW, which is mainly limited by single mode pump diode, the average power after the pulse picker is still below 0.5 mW, which requires a delicate and elaborate design for the amplification chain.

On the other hand, the free space short pulse solid-state laser system, mJ to Joule level energy has been generated, for 10 Hz to 1 KHz repetition rate, this corresponds to 1~10 W average power, which does not introduce very serious thermal issue even for room temperature laser amplifier. Higher average power requires cryogenically cooled system. Meanwhile, the fiber laser system can easily get over 100 W average power without a requirement to deal with the thermo-optic effects. However, for the fiber system, the tight confinement of laser light in a small core makes it very hard to achieve high peak power due to nonlinear effects.

Therefore, a need still exists in the art of designing and configuring a new and improved laser system with a new configuration and method to provide ultra-high energy short-pulse lasers such that the above-discussed difficulty may be resolved.

SUMMARY OF THE PRESENT INVENTION

It is therefore an aspect of the present invention to provide a high-energy short-pulse laser system with a new configuration implemented with a hybrid fiber and solid-state amplifier. A cavity-dumped mock-locked oscillator is implemented to generate a seed laser with reduced repetition rate. A very dispersive fiber with very low nonlinear coefficient such as a Photonic Band-Gap Fiber (PBF) is used in the stretcher to stretch to pulse. The multiple-stage amplifier further includes a high concentration double cladding (DC) Yb-doped photonic crystal (PC) fiber. The laser system is implemented to generate ultra-high short-pulse laser such that the above-discussed difficulties as encountered in the prior art may be resolved.

Another aspect of this invention is to provide an improved laser system that uses a large mode area (LMA) fiber, the pulse can be amplified and limted to multi-mJ by chirping/stretching the pulse (chirped pulse amplification CPA). Specificaly, a multi-mode regular double cladding (DC) YDF or DC photonic crystal (air cladding) Yb doped fiber is used to further scale the pulse to over tens of mJ.

Another aspect of this invention is to implement a new generation of all diode pumped all-solid laser system. This design can be the basis for a novel avenue targeting ultras-high energy short pulse amplifier with unprecedented and dramatically improved reliability, stability and compactness.

Another aspect of this invention is the use of the Large Mode Area (LMA) fiber with air-cladding photonic crystal fiber (PCF), which can have slightly larger core than LMA fiber, the peak power can be increased by several times. When the requirement of beam quality is not very stringent, Multi-mode (MM) can be utilized to produce a few hundred micro Joule short pulses. Furthermore, the nonlinearity is controlled to reduce the laser medium length by applying a larger compressor and by combining with a solid-state system to implement a hybrid laser system to provide ultra-high power amplifier.

Briefly, in a preferred embodiment, the present invention discloses a fiber Chirped Pulse Amplification (CPA) laser system that includes a fiber mode-locking oscillator, a fiber stretcher, a multistage amplifier chain and a pulse width compressor wherein the multistage amplifier further includes a fiber and solid-state hybrid amplifier. In a preferred embodiment, the multistage amplifier further includes a multi-mode regular double cladding (DC) YDF or a DC photonic crystal (air cladding) Yb doped fiber. In another preferred embodiment, the fiber mode-locking oscillator further includes a cavity-dumped mock-locked oscillator that includes a cavity dumper for generating a seed laser at a reduced repetition rate to project to a pulse stretcher for stretching a pulse width of the laser.

In a preferred embodiment, this invention further discloses a method for generating an ultra-high energy short-pulse laser from a Chirped pulse amplification (CPA) fiber laser system. The method includes a step of generating a seed laser from a fiber mode-locking (ML) oscillator at a reduced repetition rate to project to a pulse stretcher for stretching a pulse width of the laser. The method further includes a step of projecting the laser from the pulse stretcher to a multistage amplifier chain including a solid-state amplifier as a hybrid amplifier for generating an amplified laser to project to a compressor for compressing the amplified laser. In a preferred embodiment, the step of generating a seed laser from a fiber mode-locking (ML) oscillator further includes a step of implementing the fiber mode-locking (ML) oscillator as a cavity dumped ML oscillator including a cavity dumper. In another preferred embodiment, the step of stretching a pulse width of the laser further includes a step of implementing the pulse stretcher to include a Photonic Band-Gap Fiber (PBF). In another preferred embodiment, the step of generating an amplified laser further includes a step of implementing the multistage amplifier chain to include a high concentration double cladding (DC) Yb-doped photonic crystal (PC) fiber. In another preferred embodiment, the step of generating an amplified laser further includes a step of implementing the multistage amplifier chain to include a short piece of high concentration double cladding Yd-doped photonic crystal fiber with a large mode area (LMA) and multi-mode. In another preferred embodiment, the multistage amplifier chain further includes a hybrid amplifier that includes a solid state amplifier with a cryogenically cooled Yb:YAG crystal. The laser system is enabled to generate a laser having a power substantially over 165 CW. In another embodiment, the laser generated is approximately 1~10 mJ for a 10-100 KHz repetition rate. In a preferred embodiment, this invention further discloses a method for achieving up to 10 mJ pulse energy with 10-100 KHz repetition rate short pulse laser by combining the fiber CPA technology with the solid laser amplifier technology.

These and other objects and advantages of the present invention will no doubt become obvious to those of ordinary skill in the art after having read the following detailed description of the preferred embodiment, which is illustrated in the various drawing figures.

BRIEF DESCRIPTION OF THE DRAWINGS

FIG. 2 is a functional block diagram for showing the application of a cavity-dumped mode locked laser in a high energy fiber CPA system of this invention.

FIG. 3 shows a functional block diagram for showing the cavity-dumped mode-locked all fiber-based laser.

FIG. 4 shows a pump combiner for a DC PCF generally referred to as an air clad fiber implemented in an ultra-high power short-pulse laser of this invention.

FIG. 5 shows a DC PCF fiber structure with multi-mode core implemented in an ultra-high power short-pulse laser of this invention.

FIG. 6 is a diagram for showing the pulse energy limit versus pulse width with a dotted line showing the self-focus limit.

FIGS. 7A and 7B show the structure of an extension of the PCF fiber to rod type fiber wherein FIG. 7A is a PCF with doped core and FIG. 7B is a rod-type fiber.

DETAILED DESCRIPTION OF THE INVENTION

Figure 1:
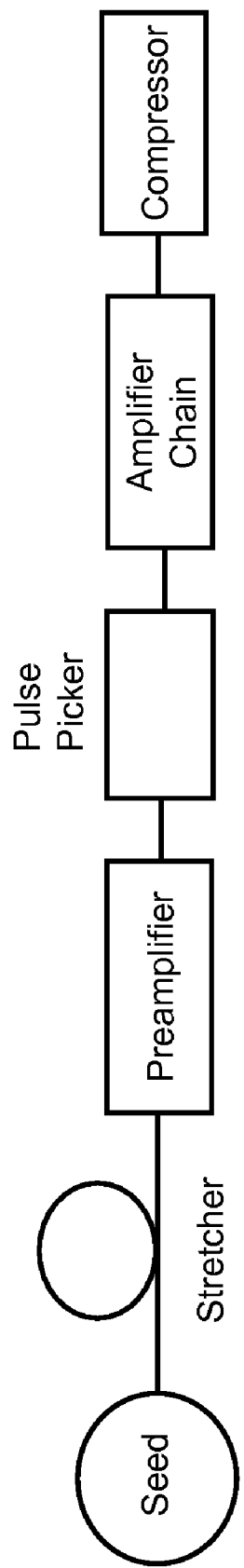
FIG. 1 is a functional block diagram for showing a fiber laser system implemented with a pulse picking-up device often implemented in a conventional system configuration.

Referring to FIG. 2 for a schematic diagram of a fiber laser system 100 of this invention that implements a dispersion compensator of this invention. The laser system 100 includes a laser seed 105 as a mode-locked (ML) oscillator that is implemented as a cavity dump ML fiber laser for generating a seed laser for projecting into a laser stretcher 110 to stretch the laser pulse. The stretcher 110 generates laser pulse with stretched pulse width is projected into series of laser amplifiers 120 to amplify the laser into higher energy. The amplified laser is then projected into a pulse compressor 125 to re-compress the pulse width of the laser to output a laser with original pulse width. There is particular advantage to combine the all-fiber based ML fiber laser with cavity dumping in the cavity-dumped ML fiber laser 105. The cavity-dumped ML fiber laser can have more than 1 mW average power with a repetition rate of 10 KHz-100 KHz. Compared to convention laser operating typically at 30-60 MHz repetition rate, the pulse repetition rate generated from the cavity-dumped ML laser 105 is decreased by three for four order of magnitudes and in the meanwhile increasing the single pulse energy by the same amount.

FIG. 3 shows an exemplary embodiment of a cavity-dumped ML laser 105 at any spectral band, such as 1550 nm (Er-doped), 1060 (Yb-doped), and 2 micron (Tm-doped). The cavity-dumped ML laser system 105 has a ring configuration receiving a laser input through a 980 or 1060 nm WDM 210. In an exemplary embodiment, a 980 nm high power pump laser diode 201 was used to pump the gain fibers 205 for amplifying the pulses circulating in the cavity. The all fiber-based cavity-dumped ML laser 105 included a gain medium 205 to amplify and compress the pulse width of a laser projection in the laser cavity. The gain medium 205 can be an Yb doped fiber (YDF), an erbium doped fiber (EDF) or a Tm doped fiber (TDF) for wavelength of 1 μm, 1.55 μm or 2 μm respectively. The gain medium 205 has high doping concentration. For an exemplary gain medium 205 of YDF, the gain medium fiber may have a high doping concentration of 600 dB/m at 976 nm, with a dispersion of −55 ps/nm/km. The cavity-dumped ML laser 105 further includes a regular transmission fiber 215 that may include a single mode (SM) fiber, e.g., a −20 ps/nm/km fiber. The cavity-dumped ML fiber laser further includes a special second fiber (not explicitly shown) for dispersion matching. For wavelength of 1 um, the second fiber may be a photonic crystal fiber PCF or photonic band-gap fiber PBF in providing anomalous dispersion. For a wavelength at approximately 1.55 um, a second fiber (not explicitly shown) is implemented with piece of SM 28 for anomalous dispersion and high NA fiber for normal dispersion. For a wavelength near 2 um, similar second fiber may be uses as that implemented for a wavelength of about 1.55 um. In this exemplary fiber based ring, a cavity dumper 225 is added to configure this ring cavity as cavity-dumped ML laser ring cavity. This cavity dumper can be an acoustic-optic (AO) crystal or an electronic-optic (EO) crystal, integrated in a fiber package. Similar with what happens in solid-state ML laser, when the cavity dumper is off, the laser is operated as normal ML oscillator; when the cavity dumper is on, the ML pulse train is converted into a huge pulse. The operating frequency of the cavity dumper determines the final output repetition rate, at the same time most of the ML power disappears.

This configuration can be extended to Yb doped fiber laser operation immediately. The benefit is that we can make use of the high gain of Yb fiber. Also this facilitates the ultrahigh peak power fiber laser system since we can use the cavity dumping fiber ML laser as a seed. In that system, there is no need to use pulse picker, the low frequency pulse can be amplified directly. This largely decreases the system complexity and improves the stability. The detail will be described in an independent patent application.

The cavity-dumped ML laser 105 employs in-line polarization controllers 240-1 and 240-2 before and after an in-line polarizing isolator 235 that is implemented with single mode (SM) fiber pigtails. The in-line polarization sensitive controllers 240-1 and 240-2 can be implemented by a product available from General Photonic (e.g., one of PolaRite family products). The polarizing isolator 235 has a high extinction ratio and only allows one linear polarization pass through over a wide spectrum. Due to nonlinear effects of SPM, the index of refraction will be dependent on the power intensity so that, in each individual pulse, high intensity peak will experience different intensity-induced birefringence with what low intensity wings will experience. When aligning the peak polarization with the polarizing isolator 235, only peak portion of the pulse can be transmitted and the wings portion will be blocked. Therefore, the pulse can be mode locked to femtosecond level by combining the polarization shaping and dispersion management. A polarization splitter is used as a coupler 230 to couple partial of the light as output of the cavity at a given polarization state.

A few issues need to be addressed to realize a cavity dumping operation for ML fiber laser. The first issue is the stable ML operation with a cavity dumper. When the cavity dumper is off, the laser oscillator should have a steady state ML operation. In principle, when the cavity dumper is off, it acts as a passive component, like normal fiber with some loss. So for ML operation, it is necessary to optimize the cavity loss. The low loss fiber based AO or EO crystal may be employed with high gain doping fiber to overcome the loss.

The second issue is correlated with the dynamic lasing process. After cavity dumping, the cavity will display a dynamic recovery process until steady state mode-locking operation is back. In general, the dynamic recovery depends on the gain and loss balance and the cavity dumping efficiency. The higher the dumping efficiency is, the longer the recovery time would be. The dynamic recovery is also related to the gain dynamics. For very short lifetime laser medium or very long lifetime laser medium, the cavity dumping displays a steady state dumping operation. For the laser medium has a lifetime close to the inverse repetition rate, the output would become unstable. Another relating issue is the extinction ratio. Due to the dynamic feature of the dumping process, the contrast between the cavity-dumped pulse and the adjacent background ML pulse can be pretty poor (as low as 20:1). Basically we have two ways to mitigate it. First, choose a better cavity dumper crystal can help increase the contrast ratio (as high as 2000:1 ratio has been demonstrated). Second, if higher contrast ratio is required, a pulse cleaner may also be implemented.

The third issue relates to the nonlinear effects. In single mode fiber, this energy (10~100 nJ) can stimulate very strong nonlinear effects. Two main effects are identified for short pulse amplification. Stimulated Raman Scattering (SRS) will transfer a lot of energy to other wavelength and degrade the pulse quality; Self-Phase-Modulation (SPM) can be controlled to increase the bandwidth and improve the compressibility. Thus it is necessary need to remove SRS and control SPM to realize shortest compressible laser pulse. In order to achieve that purpose, the whole cavity average dispersion of the cavity-dumped ML laser is designed to operate at anomalous dispersion ($\beta''<0$). The second fiber (not shown), e.g., a PC fiber, can provide both normal and anomalous dispersion at 1060 nm range with its uniquely structured properties and can also manipulate their dispersion slope, a fiber laser cavity can be designed with both dispersion and dispersion slope matched so the pulse can be narrowed to the maximum. In contrast to the prior art technologies, the system as shown in FIG. 3 considers polarization evolution in both time domain (intensity dependent) and spectral domain (wavelength dependent) in achieving ultra-short pulse <50 fs. The polarization filtering is achieved by managing both dispersion and dispersion slope and further by using fiber-based inline polarizing isolator and polarization controllers.

Different from other approaches in achieving short pulse mode locked fiber lasers, a special all fiber cavity as that disclosed in FIG. 3 manages the pulse propagation in the cavity and balance the SPM and dispersion to reduce the saturation effects in the amplification region. As disclosed in two previously co-pending patent application Ser. Nos. 11/093,519 and 11/136,040 filed by a common inventor of this Application, the cavity laser achieves short pulse mode locked fiber lasers at one micron region by implementing a totally different configuration. The disclosures made in these Applications are hereby incorporated by reference. A sigma configuration is disclosed that provides the advantages of managing the pulse propagation in the cavity and in the meantime balance the self-phase modulation (SPM) and dispersion to reduce the saturation effects in the amplification region. On the other hand, NPE induced by the nonlinear phase change of SPM will make the polarizations within single pulse intensity dependent. When the pulse is transmitted through the polarization sensitive splitter, only the highest intensity lined up with the splitter (by adjusting the polarization controllers) is passed and the lower intensity part of the pulse will be filtered and the pulse therefore be shaped. This works as a saturation absorber (SA) and reduce the pulse width.

The cavity-dumped ML fiber laser 105 as described in FIGS. 2 and 3 can play an important role. It is standard alone moderate energy ML laser, comparable with the cavity-dumped solid-state ML laser, but more compact and stable. It can also become a seed for the higher energy pulse amplifier. In a single mode fiber, the signal of approximately 10~100 nJ as generated from the cavity-dumped ML fiber laser 105 can stimulate very strong nonlinear effects. Some of them are deleterious; some of them can be helpful. Two main effects are identified for short pulse amplification. Stimulated Raman Scattering (SRS) will transfer a lot of energy to other wavelength and degrade the pulse quality; while being intense enough, it also might damage the components along the fiber amplifier, including the pumping diode. On the other hand, Self-Phase-Modulation (SPM) can be controlled to increase the bandwidth and improve the compressibility. Thus it is necessary to remove SRS and control SPM, especially within a very long fiber stretcher. For this reason, special designs must be implemented in the amplifier chain 120 as further described below.

Referring to FIG. 2 again for the laser output projected from the seed laser implemented with a cavity dumped ML fiber laser to the stretcher 110. The first issue is the nonlinear effects within the fiber stretcher 110. The solution for this problem depends on the properties of the output of the cavity-dumped ML fiber laser. In principle, to reduce the nonlinear effects, one has to limit the fiber length, increase the fiber core and decrease the peak power. However, the huge stretching ratio, which is essential for high-energy amplification, requires long stretching fiber. Or one has to use very dispersive fiber with very low nonlinear coefficient. One solution is to use Photonic Band-Gap Fiber (PBF) to stretch to pulse. On the other hand, supposing the output from the cavity-dumped ML fiber laser 105 has a broadband due to SPM, has some Stokes components due to SRS, and most importantly, has a long pulse duration (>10 ps), the stretcher 110 can have a normal design using commercially available single mode fiber with certain modification. The Stokes component needs to be removed since it can acts as a seed and get large amplification in the fiber stretcher. One possible solution is to introduce fiber based Raman filter to remove it. Secondly, fiber without Ge doping should be used to minimize the Raman effect coefficient. The SPM grows in a controllable way; it benefits the bandwidth and stretching.

The second issue correlates to the spectrum cutting and/or gain narrowing during the fiber amplification process. Now that the fiber stretcher has obtained >1 ns pulse, >100 nm bandwidth, because of the narrow gain spectrum, especially for Yb:fiber near 1030 nm, the signal bandwidth will be largely reduced. Supposing the chirp is mainly linear chirp, the pulse duration would be reduced accordingly. For gain narrowing issue, one can shift the signal spectrum to 1060 nm, which has a wider bandwidth. However, while the gain is lower, one has to use longer fiber which turns against the control of nonlinear effects. This situation requires careful attention to the nonlinear effects within the fiber amplification chain, especially SRS; remove it with Raman filter if necessary.

In order to achieve ultra-high power of a laser output, the amplification chain 120 may be implemented with a ultra-short femtosecond fiber amplifier by using a high concentration double cladding (DC) Yb-doped photonic crystal (PC) fiber 250 shown in FIG. 4 as the gain medium. A laser pump of 915 or 980 nm is used to pump Yb ions for amplification of the chirped ultra-short pulses (ps or fs) through coupling optics or fiber pump combiner (Crystal Fiber, Denmark). Amplification of the pulses can be achieved by using a short piece of high concentration double cladding Yd-doped photonic crystal fiber 260 with large mode area (LMA or multi mode) as shown in FIG. 5. The multimode structure of core of the DCYDF combined with short length help reduce the nonlinear effects such as SPM and SRS. When the core diameter can be increased to 200 μm, a stretched pulse with tens of ns pulse width can usually be amplified to tens of mJ without any self-focusing issue. The self-focusing is a fundamental limit for fiber laser in high peak power operation. FIG. 6 is a diagram shows a damage threshold versus pulse duration by M. Cheng, et al. (Optical Letter 30 (4), 358, 2005). As illustrated in FIG. 6, a laser projection over 20 mJ may be achieved by using a 200 mm multimode fiber with a pulse width of 50 ns and over 80 mJ for 200 ns pulse.

Another feature of using DC PCF multimode fiber is that it can provide a large NA (>0.6 vs 0.4 for regular DCYDF). This will be able to couple more pump light into the fiber and obtain higher and more efficient power amplification. Even though a DC PCF multi mode Yb-doped fiber is disclosed as an exemplary embodiment, application of a multi-mode fiber can extent to regular DC multi mode YDF and other rare earth doped fibers such as Er, Er/Yb codoped, Tm, and other rare eath doped multi-mode fibers implemented as amplifing gain medium.

In addition to above DC PCF multimode fiber, the laser system may implement an intermediate laser medium with a laser core larger than common fiber. As shown in FIG. 7A, this intermediate laser medium is a direct extension of the PCF. With a decreased pump/core ratio for higher pump absorption, the fiber length can be reduced to within 1 meter. Furthermore, by increasing the fiber diameter the bending loss is reduced the mechanical strength is increased. Additionally, better thermal properties are achieved by removing the coating. With such short rod-type fiber less than 50 cm with extreme SM core sizes (50-100 μm), very high peak power amplification is possible. Actually, for CW operation, more than 160 W has been generated under room temperature operation. Due to the short length and larger core size, it is extremely useful in the high-energy short pulse amplifier. For a 10-100 KHz laser system, this actually leads to the avenue to achieve 1-10 mJ short pulse lasers.

Another way to achieve higher energy for short pulse fiber amplifier is to combine the fiber system with solid-state system to obtain a hybrid system. Currently a 100 μJ short pulse in the all fiber Yb-doped amplifier has been generated. Such pulses can be seeded into a solid-state amplifier, which can handle such high peak power and high average power simultaneously. The Yb:YAG crystal for application in the solid-state amplifiers has been extensively studied. The YAG crystal has the highest thermal conductivity and fracture resistance available, assuring its application as a medium for solid-state lasers. Over 165 W CW power has been produced for cryogenically cooled Yb:YAG laser. Thin-disc geometry, technology and more powerful diode pumps have combined to produce a new generation of solid-state lasers. A hybrid fiber system and all solid diode is able to pump and generate very high energy short pulse laser amplifier. Combined with the 100 μJ short pulse all-fiber Yb-doped amplifier, this hybrid system actually provide another practical configuration to achieve 1~10 mJ for 10-100 KHz system.

Figure 8A:
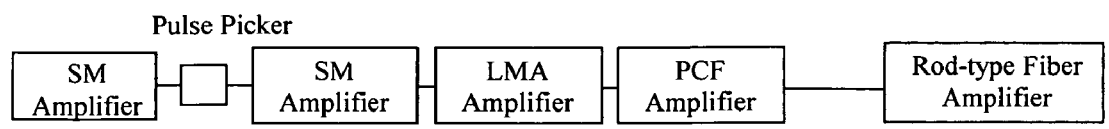
FIGS. 8A and 8B are two functional block diagrams for showing the hybrid fiber with solid-state ultra-high energy short pulse lasers of this invention.
Figure 8B:
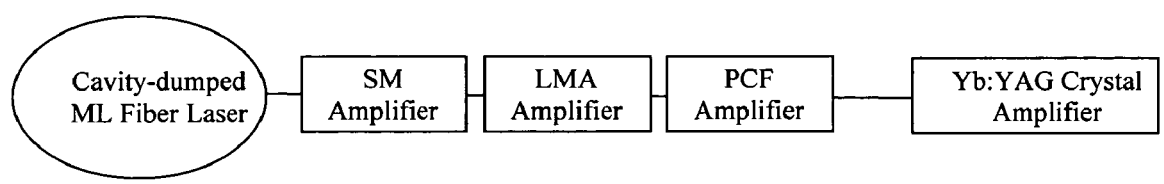

FIGS. 8A and 8B are two functional block diagrams for depicting the hybrid laser amplifiers wherein one including a fiber and rod-type fiber amplifier system as shown in FIG. 8A; and a fiber and solid-state hybrid laser system in FIG. 8B for generating an ultra-high energy while achieving a femtosecond pulse width. FIG. 8A shows the amplification chain using rod-type fiber amplifier as an exemplary embodiment wherein the system is implemented without the option of including a cavity-dump into the system. There is an option to implement the cavity-dump structure for this configuration. FIG. 8B shows the amplification chain using solid state, e.g., Yb:YAG crystal amplifier. In this exemplary embodiment, the system is implemented with cavity-dumped oscillator. Further option is to use a pulse picker after the normal ML oscillator for this configuration.

According to above drawings and descriptions, this invention discloses a Chirped pulse amplification (CPA) fiber laser system that includes a fiber mode-locking (ML) oscillator implemented as a cavity dumped ML oscillator including a cavity dumper for generating a seed laser at a reduced repetition rate to project to a pulse stretcher for stretching a pulse width of the laser. The CPA laser system further includes a a multistage amplifier chain for generating an amplified laser to project to a compressor for compressing the amplified laser. In a preferred embodiment, the cavity dumper includes an acoustic-optic (AO) crystal integrated in a fiber package. In a preferred embodiment, the cavity dumper further includes an electronic-optic (EO) crystal integrated in a fiber package. In a preferred embodiment, the fiber ML oscillator further includes a ring cavity oscillator includes an oscillator gain medium. In a preferred embodiment, the oscillator gain medium further includes an Er-doped fiber. In a preferred embodiment, the oscillator gain medium further includes an Yb-doped fiber. In a preferred embodiment, the oscillator gain medium further includes an Tm-doped fiber. In a preferred embodiment, the cavity dumped ML oscillator generating an average power in a range approximately 1 mW and higher with a repetition rate of in a range substantially between 10 KHz to 100 KHz. In a preferred embodiment, the cavity dumped ML oscillator further includes in-line polarization controller and a polarizing isolator for aligning a peak polarization with the polarizing isolator for mode locking a laser pulse to a femtosecond level. In a preferred embodiment, the pulse stretcher further includes a dispersive fiber with a low nonlinear coefficient. In a preferred embodiment, the pulse stretcher further includes a Photonic Band-Gap Fiber (PBF). In a preferred embodiment, the pulse stretcher further includes a fiber based Raman filter. In a preferred embodiment, the pulse stretcher further includes a fiber without Ge doping. In a preferred embodiment, the multistage amplifier chain further includes a ultra-short femtosecond fiber amplifier. In a preferred embodiment, the multistage amplifier chain further includes a high concentration double cladding (DC) Yb-doped photonic crystal (PC) fiber. In a preferred embodiment, the multistage amplifier chain further includes a short piece of high concentration double cladding Yd-doped photonic crystal fiber with a large mode area (LMA) and multi-mode. In a preferred embodiment, the multistage amplifier chain further includes a multimode structure of a DCYDF core with a short length for reducing nonlinear SPM and SRS effects with a core diameter a approximately 200 μm for amplifying a pulse of tens of ns pulse width to tens of mJ without a self-focusing. In a preferred embodiment, the multistage amplifier chain further includes a DC PCF multimode fiber with a large NA at substantially greater than 0.6. In a preferred embodiment, the multistage amplifier chain further includes a regular DC multi mode YDF. In a preferred embodiment, the multistage amplifier chain further includes rare earth doped fibers. In a preferred embodiment, the multistage amplifier chain further includes Er, Er/Yb, Tm, and rare eath doped multi-mode fibers. In a preferred embodiment, the multistage amplifier chain further includes a short rod-type fiber less than 50 cm with a SM core sizes substantially in a range between 50 μm to 100 μm. In a preferred embodiment, the multistage amplifier chain further includes a hybrid amplifier includes a solid-state amplifier. In a preferred embodiment, the multistage amplifier chain further includes a hybrid amplifier includes a solid state amplifier with a Yb:YAG crystal. In a preferred embodiment, the multistage amplifier chain further includes a hybrid amplifier includes a solid state amplifier with a cryogenically cooled Yb:YAG crystal for generating a laser having a power substantially over 165 CW. In a preferred embodiment, the multistage amplifier chain further includes a solid-state diode to pump and generate a high-energy short pulse laser. In a preferred embodiment, the multistage amplifier chain further includes a hybrid amplifier includes a solid state amplifier to generate a laser of approximately 1~10 mJ for a 10-100 KHz repetition rate.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A chirped pulse amplification (CPA) fiber laser system, comprising:
    a fiber-based mode-locking (ML) oscillator configured to generate first laser pulses at a first repetition rate in response to a pump light;
    a cavity dumper configured to produce seed laser pulses at a second repetition rate lower than the first repetition rate;
    a pulse stretcher configured to stretch pulse widths of the seed laser pulses to produce stretched laser pulses;
    a multistage amplifier configured to generate amplified laser pulses in response to the stretched laser pulses; and
    a compressor configured to compress the amplified laser pulses to produce output laser pulses.

2. The CPA fiber laser system of claim 1, wherein the cavity dumper comprises an acoustic-optic (AO) crystal integrated in a fiber package.

3. The CPA fiber laser system of claim 1, wherein the cavity dumper comprises an electronic-optic (EO) crystal integrated in a fiber package.

4. The CPA fiber laser system of claim 1, wherein the fiber-based ML oscillator comprises a ring cavity oscillator that includes an oscillator gain medium.

5. The CPA fiber laser system of claim 4, wherein the oscillator gain medium comprises an Er-doped fiber.

6. The CPA fiber laser system of claim 4, wherein the oscillator gain medium comprises an Yb-doped fiber.

7. The CPA fiber laser system of claim 4, wherein the oscillator gain medium comprises an Tm-doped fiber.

8. The CPA fiber laser system of claim 1, wherein the seed laser pulses have an average power more than 1 mW, wherein the second repetition rate is in a range between about 10 KHz and about 100 KHz.

9. The CPA fiber laser system of claim 1, further comprising:
    an in-line polarization controller; and
    a polarizing isolator configured to pass the amplified laser pulses in a linear polarization, wherein the in-line polarization controller is configured to align a peak polarization of the amplified laser pulses with the linear polarization of the polarizing isolator to mode lock the amplified laser pulses.

10. The CPA fiber laser system of claim 1, wherein the pulse stretcher comprises a dispersive fiber with a low nonlinear coefficient.

11. The CPA fiber laser system of claim 1, wherein the pulse stretcher comprises a Photonic Band-Gap Fiber (PBF).

12. The CPA fiber laser system of claim 1, wherein the pulse stretcher comprises a fiber based Raman filter.

13. The CPA fiber laser system of claim 1, wherein the pulse stretcher comprises a fiber without Ge doping.

14. The CPA fiber laser system of claim 1, wherein the multistage amplifier comprises an ultra-short femtosecond fiber amplifier.

15. The CPA fiber laser system of claim 1, wherein the multistage amplifier comprises a high concentration double cladding (DC) Yb-doped photonic crystal (PC) fiber.

16. The CPA fiber laser system of claim 1, wherein the multistage amplifier comprises a short piece of high concentration double cladding Yd-doped photonic crystal fiber with a large mode area (LMA) and multi-mode.

17. The CPA fiber laser system of claim 1, wherein the multistage amplifier comprises a multimode structure of a DCYDF core for reducing nonlinear SPM and SRS effects, wherein the multimode structure has a core diameter about 200 μm.

18. The CPA fiber laser system of claim 1, wherein the multistage amplifier comprises a DC PCF multimode fiber with a large NA at substantially greater than 0.6.

19. The CPA fiber laser system of claim 1, wherein the multistage amplifier comprises a regular DC multi mode YDF.

20. The CPA fiber laser system of claim 1, wherein the multistage amplifier comprises rare earth doped fibers.

21. The CPA fiber laser system of claim 1, wherein the multistage amplifier comprises Er, Er/Yb, Tm, or rare earth doped multimode fibers.

22. The CPA fiber laser system of claim 1, wherein the multistage amplifier comprises a short rod-type fiber less than 50 cm with a SM core sizes substantially in a range between about 50 cm and about 100 μm.

23. The CPA fiber laser system of claim 1, wherein the multistage amplifier comprises a hybrid amplifier comprising a solid state amplifier.

24. The CPA fiber laser system of claim 1, wherein the multistage amplifier comprises a hybrid amplifier comprising a solid state amplifier with a Yb:YAG crystal.

25. The CPA fiber laser system of claim 1, wherein the multistage amplifier comprises a hybrid amplifier comprising a solid state amplifier with a cryogenically cooled Yb:YAG crystal configured to generate a laser having a power substantially over 165 CW.

26. The CPA fiber laser system of claim 1, wherein the multistage amplifier comprises a solid state diode to pump and generate a high energy short pulse laser.

27. The CPA fiber laser system of claim 1, wherein the multistage amplifier comprises a hybrid amplifier comprising a solid state amplifier to generate a laser of about 1-10 mJ at a 10-100 KHz repetition rate.

28. A chirped pulse amplification (CPA) fiber laser system, comprising:
a fiber-based mode-locking (ML) oscillator configured to generate first laser pulses at a first repetition rate in response to a pump light;
a cavity dumper configured to produce seed laser pulses at a second repetition rate lower than the first repetition rate;
a pulse stretcher configured to stretch pulse widths of the seed laser pulses to produce stretched laser pulses;
a multistage amplifier configured to generate amplified laser pulses in response to the stretched laser pulses, wherein the multistage amplifier includes a hybrid amplifier comprising a solid state amplifier; and
a compressor configured to compress the amplified laser pulses to produce output laser pulses.

29. The CPA fiber laser system of claim 28, wherein the multistage amplifier comprises a hybrid amplifier comprising a solid state amplifier.

30. The CPA fiber laser system of claim 28, wherein the pulse stretcher comprises a Photonic Band-Gap Fiber (PBF).

31. The CPA fiber laser system of claim 28, wherein the multistage amplifier chain comprises a high concentration double cladding (DC) Yb-doped photonic crystal (PC) fiber.

32. The CPA fiber laser system of claim 28, wherein the multistage amplifier chain comprises a double cladding Yd-doped photonic crystal fiber with a large mode area (LMA).

33. A method for generating an ultra-high energy short-pulse laser from a chirped pulse amplification (CPA) fiber laser system, comprising:
generating first laser pulses at a first repetition rate by a fiber-based mode-locking (ML) oscillator in response to a pump light;
producing seed laser pulses at a second repetition rate lower than the first repetition rate by a cavity dumper;
stretching pulse widths of the seed laser pulses by a pulse stretcher to produce stretched laser pulses;
generating amplified laser pulses by a multistage amplifier in response to stretched laser pulses; and
compressing the amplified laser pulses by a compressor to produce output laser pulses.

34. The method of claim 33, wherein the multistage amplifier comprises a hybrid amplifier comprising a solid state amplifier.

35. The method of claim 33, wherein the pulse stretcher includes a Photonic Band-Gap Fiber (PBF).

36. The method of claim 33, wherein the multistage amplifier chain includes a high concentration double cladding (DC) Yb-doped photonic crystal (PC) fiber.

37. The method of claim 33, wherein the multistage amplifier chain includes a short piece of high concentration double cladding Yd-doped photonic crystal fiber with a large mode area (LMA) and multi-mode.

* * * * *